Patented Feb. 20, 1945

2,369,839

UNITED STATES PATENT OFFICE 2,369,839

DOUBLE SALTS OF PANTOTHENAMIDE AND PROCESS OF PREPARING THEM

Marjorie B. Moore, Waukegan, Ill., assignor to Abbott Laboratories, a corporation of Illinois No Drawing. Application July 10, 1941, Serial No. 401,796

5 Claims. (Cl. 260—561)

The present invention relates to pure pantothenic acid double salt compositions and in particular to pantothenamide and combination inorganic salts thereof. These double salts or salt complexes have been found to be characterized by biological (vitamin B) activity.

Pantothenic acid is known to be one of the factors in the vitamin B complex. It may be made synthetically (U. S. Patent No. 2,234,680—March 11, 1941), but is extremely difficult to purify because it is a liquid which cannot be distilled or crystallized.

I have discovered that double salt formation furnishes improved means for purification of pantothenic acid compositions. For example, I have discovered that pantothenamide may be readily prepared and that it may be readily purified by precipitation as a double salt. The biological activity of pantothenamide and the double salts is about equivalent to the stoichiometric equivalent of calcium pentothenate when tested upon chicks by the accepted methods.

The principal object of the present invention is to provide new compositions of high purity characterized by the biological effect of pantothenic acid.

Another object of the present invention is to provide improved means for obtaining pantothenic acid compositions of standardized biological activity.

Other objects will be apparent as the detailed description hereinafter proceeds.

The following example will serve to illustrate the present invention.

EXAMPLE

(a) Pantothenonitrile

About 65 grams of $\alpha$-hydroxy-$\beta,\beta$-dimethyl-$\gamma$-butyrolactone and about 35 grams of $\beta$-aminopropionitrile are mixed together and after standing for a time are heated to around 90°–100° C. for about 0.5 hour to complete the reaction. When the reactants are mixed some heat is evolved and a homogenous liquid is obtained. The final heating assures complete condensation.

The product so obtained is a very viscous liquid with a slight greenish fluorescence. It cannot be distilled at $10^{-4}$ mm. up to 120° C. This product, pantothenonitrile, when tested on pantothenic acid deficient chicks shows no curative effect at a high level.

(b) Pantothenamide

The pantothenonitrile prepared, for example, as described above may be hydrolized to the amide as follows.

About 100 grams of pantothenonitrile is dissolved in about 1500 cc. of 3 per cent hydrogen peroxide solution and stirred in a water bath at 20° C. for about 2 hours. The solution is next evaporated in a vacuum oven at about 50° C. and the resulting syrup taken up in absolute alcohol and filtered with the aid of a little charcoal. The filtrate is then vacuum distilled to remove the solvent and finally dried in vacuum at 100° C. over $P_2O_5$. The final product, pantothenamide, is a viscous liquid with a slight amber color.

Further purification may be effected by repeating the treatment with alcohol. The product, however, does not crystallize and cannot be distilled at $10^{-4}$ mm. up to 120° C. It is readily soluble in methyl and ethyl alcohols and insoluble or sparingly soluble in dry acetone, ethyl acetate, benzene and petroleum ether.

(c) Double salts of pantothenamide

The pantothenamide prepared, for example, as described above, is dissolved in absolute alcohol and the solution mixed with an alcoholic solution of an inorganic salt such as calcium chloride. As 1 mole of salt combines with 1 mole of pantothenamide molecular proportions are employed. The resulting double salts are soluble in alcohol and may be readily thrown out in pure form from the clear solution by addition of several volumes of acetone or ether.

The following list of double salts will serve for illustrative purposes:

TABLE

Formula of double salt

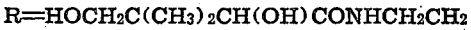

| | |
|---|---|
| (1) | $RCONH_2.CaCl_2.H_2O$ |
| (2) | $RCONH_2.Co(NO_3)_2.2H_2O$ |
| (3) | $RCONH_2.Cu(NO_3)_2.2H_2O$ |
| (4) | $RCONH_2.MnCl_2.H_2O$ |
| (5) | $RCONH_2.Ce(NO_3)_3.2H_2O$ |
| (6) | $RCONH_2.Ca(CNS)_2.H_2O$ |
| (7) | $RCONH_2.2MgCl_2$ |

Other di- and trivalent inorganic salts may be used as well as other solvent combinations for carrying out the reaction, precipitation, etc. For therapeutic purposes the inorganic salt selected should be of low toxicity and preferably substantially non-toxic. Investigations have shown that divalent metal salts, such as calcium salts, are especially adapted for commercial use. The calcium chloride double salt, (1) above, is readily precipitated in good yield and is only slightly hygroscopic.

Pure double salts may also be precipitated by the addition of acetone or ether to an absolute alcohol solution containing an inorganic salt of pantothenic acid and a molecular proportion of an inorganic salt. These double salts also furnish improved means of purification of pantothenate compounds. In addition to the metal salts of the above table the following alkali metal and alkaline earth metal double salts are illustrative.

$HOCH_2C(CH_3)_2CH(OH)$
$\quad CONHCH_2CH_2COONa.CaCl_2$
$[HOCH_2C(CH_3)_2CH(OH)$
$\quad CONHCH_2CH_2COO]_2Ca.2CaCl_2$ The present invention provides improved compositions and improved methods of obtaining the same of particular value in the biological vitamin art. The invention also has particular utility in the therapeutic field as the high purity of the double salts or complexes described herein makes them particularly adaptable for use in compositions having standardized biological effects.

It will be understood that the present invention is not limited to the above illustrative example. All modifications of the present invention are intended to be covered by the following claims.

1. A pantothenamide-inorganic salt complex, the metal of said inorganic salt being calcium.

2. A pantothenamide-calcium chloride salt complex.

3. As a new product, a pantothenamide-inorganic salt complex, the metal of said salt being selected from the group consisting of non-toxic di- and trivalent metals.

4. In the process of preparing a pantothenamide inorganic salt product of value in the biological art, the steps which consist in (1) condensing α-hydroxy-β, β-dimethyl-γ-butyrolactone with β-aminopropionitrile, (2) hydrolyzing the pantothenonitrile resulting from the condensation in (1), and (3) reacting the pantothenamide resulting from the hydrolysis in (2) with a substantially non-toxic inorganic salt.

5. In the process of preparing products of value in the biological art, the steps which consist in (1) the condensation of α-hydroxy-β, β-dimethyl-γ-butyrolactone with β-aminopropionitrile, and (2) the hydrolysis of pantothenonitrile resulting from the condensation of (1) to the desired pantothenamide.

MARJORIE B. MOORE.